US008208030B2

United States Patent
Siddiqui et al.

(10) Patent No.: US 8,208,030 B2
(45) Date of Patent: Jun. 26, 2012

(54) METHOD AND UNIT FOR MOTION DETECTION BASED ON A DIFFERENCE HISTOGRAM

(75) Inventors: Muhammad Siddiqui, Stuttgart (DE); Christian Unruh, Stuttgart (DE)

(73) Assignee: Sony Corporation, Tokyo (JP)

( * ) Notice: Subject to any disclaimer, the term of this patent is extended or adjusted under 35 U.S.C. 154(b) by 289 days.

(21) Appl. No.: 12/560,015

(22) Filed: Sep. 15, 2009

(65) Prior Publication Data

US 2010/0091126 A1    Apr. 15, 2010

(30) Foreign Application Priority Data

Oct. 14, 2008    (EP) .................................... 08017968

(51) Int. Cl.
*H04N 5/228*    (2006.01)
(52) U.S. Cl. ............. 348/208.1; 348/208.99; 348/208.3; 348/208.4; 382/172
(58) Field of Classification Search .......... None
See application file for complete search history.

(56) References Cited

U.S. PATENT DOCUMENTS

| 6,298,144 | B1 * | 10/2001 | Pucker et al. | 382/103 |
| 6,809,758 | B1 * | 10/2004 | Jones | 348/208.99 |
| 7,880,769 | B2 * | 2/2011 | Qi | 348/208.99 |
| 2005/0002552 | A1 | 1/2005 | Dunn et al. | |

FOREIGN PATENT DOCUMENTS

| EP | 0 910 035 A1 | 4/1999 |
| EP | 1 924 097 A1 | 5/2008 |

OTHER PUBLICATIONS

Nariman Habili, et al., "Automatic Thresholding for Change Detection in Digital Video", In Visual Communications and Image Processing 2000, Proceedings of SPIE, vol. 4067, XP007907406, Jun. 21, 2000, pp. 133-142.

C. K. Lee, et al., "Real-time Thresholding using Histogram Concavity", Industrial Electronics, Proceedings of the IEEE International Symposium, XP010045505, May 25, 1992, pp. 500-503.

P. K. Sahoo, et al., "A Survey of Thresholding Techniques", Computer Vision, Graphics and Image Processing, vol. 41, No. 2, XP000000250, Feb. 1, 1988, pp. 233-260.

Eliza Yingzi Du, et al., "An Unsupervised Approach to Color video Thresholding", IEEE International Conference on Acoustics, Speech and Signal Processing Proceedings, vol. 3, Apr. 6, 2003, pp. III 373-III 376.

(Continued)

*Primary Examiner* — Anthony J Daniels
(74) *Attorney, Agent, or Firm* — Oblon, Spivak, McClelland, Maier & Neustadt, L.L.P.

(57) ABSTRACT

Method for motion detection in a current picture (CP) with respect to a reference picture (RP), wherein for a plurality of locations in the current picture (CP) respective difference values (|D|) are determined (B100). A respective difference value is determined based on a difference between a first value and a second value, wherein the first value is descriptive of a photometric measure of one of the locations in the current picture (CP) and the second value is descriptive of the photometric measure of a corresponding location in the reference picture (RP). Based on the difference values, a histogram is determined (B102). The histogram is used as a basis for determining (B104) a threshold (T1, T2, T3). At a respective location in the current picture (CP), motion is detected by comparing the threshold (T1, T2, T3) to the difference value (|D|) of the respective location.

19 Claims, 16 Drawing Sheets

OTHER PUBLICATIONS

Chih-Chung Hsu, et al., "Efficient Moving Object Extraction in Compressed Low-bit-rate Video", Intelligent Information Hiding and Multimedia Signal Processing, International Conference on, IEEE, XP031034083, Dec. 1, 2006, pp. 411-414.

Lawrence O'Gorman, "Binarization and Multithresholding of Document Images Using Connectivity", CVGIP: Graphical Models and Image Processing, vol. 56, No. 6, Nov. 1994, pp. 494-506.

Paul L. Rosin, et al., "Image difference threshold strategies and shadow detection", British Machine Vision Conference, 1995, 10 pages.

Stephen B. Gray, "Local Properties of Binary Images in Two Dimensions", IEEE Transactions on Computers, vol. c-20, No. 5, May 1971, pp. 551-561.

Marc Hensel, et al., "Motion and Noise Detection for Adaptive Spatio-Temporal Filtering of Medical X-Ray Image Sequences", 14th International Conference of Medical Physics (ICMP 2005), Sep. 14-17, 2005, 4 pages.

European Office Action issued Apr. 4, 2011, in Patent Application No. 08 017 968.2.

European Office Action issued Nov. 8, 2010, in Patent Application No. 08017968.2.

European Office Action issued Sep. 29, 2011, in Patent Application No. 08017968.2.

Office Action mailed Dec. 21, 2011, in Chinese Patent Application No. 200910204225.8 (with English-language translation).

* cited by examiner

METHOD AND UNIT FOR MOTION DETECTION BASED ON A DIFFERENCE HISTOGRAM

The invention relates to a method and a unit for motion detection in a current picture with respect to a reference picture. The invention also relates to an image capturing device. The invention also relates to an image displaying device and a computer program product.

BACKGROUND

Nowadays, in many electronic and consumer devices, imaging techniques are used in order to provide information or multimedia entertainment. In order to ensure a high quality reproduction of transmitted image information, noise reduction methods are commonly used.

Conventional techniques for temporal noise reduction in sequences of images encounter the problem of generating motion artifacts, in particular for high noise images, e.g. captured with high sensitivity under low luminance conditions. In the resulting low contrast images, the algorithms cannot differentiate between a desired image content and a noise disturbance. As a result, motion artifacts may be caused e.g. in regions of a sequence of images showing moving objects. The higher the noise level, e.g. due to a high sensitivity of the camera, the more severe is the problem encountered by the conventional techniques.

Besides avoiding the motion artifacts, it can also be a challenge to keep the natural impression in a sequence of images, e.g. when showing moving objects.

It is an object of the invention to avoid such problems.

This object is solved by a method for motion detection according to claim 1, by a motion detection unit according to claim 13, by an image capturing device according to claim 18, by an image displaying device according to claim 19 and by a computer program product according to claim 20. Further embodiments are defined in the dependent claims.

BRIEF DESCRIPTION OF THE DRAWINGS

The accompanying drawings are included to provide a further understanding of embodiments and are incorporated in and constitute part of this specification. The drawings illustrate embodiments and together with the description serve to explain principles of the embodiments. The elements of the drawings are not necessarily to scale relative to each other. Like reference numerals designate corresponding similar parts.

DETAILED DESCRIPTION

In the following, embodiments of the invention are described. It is important to note that all described embodiments and their properties and technical features may be combined in any way, i.e. there is no limitation that certain described embodiments, properties, and technical features may not be combined with others.

Figure 1:
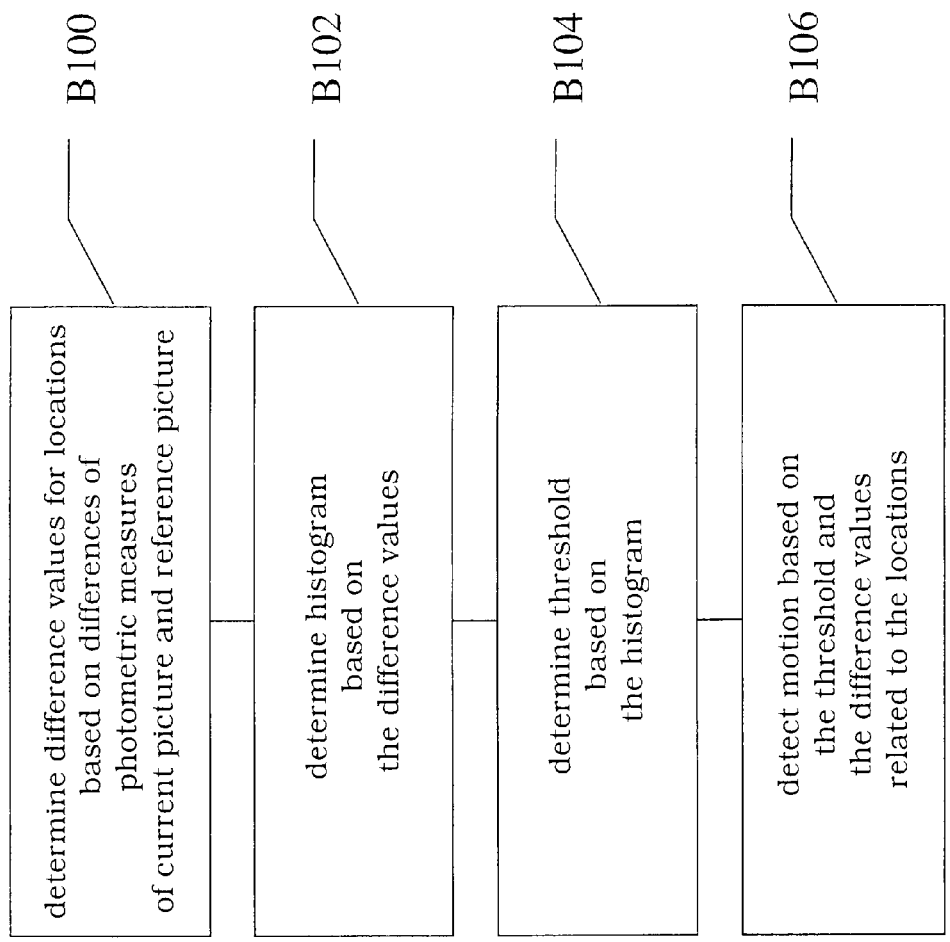
FIG. 1 is a block diagram illustrating one embodiment of a method for motion detection.

FIG. 1 is a block diagram illustrating one embodiment of a method for motion detection in a current picture with respect to a reference picture.

At block B100, the current picture is compared to the reference picture.

The current picture and the reference picture may belong to a sequence, series or set of pictures, for which a temporal order may be defined. For example, the sequence of pictures may include image frames or fields that might have been taken by a video camera or a digital camera for still images as an image capturing device.

In this case, both pictures belong to a sequence of pictures over time. The reference picture may be previous to the current picture, e.g. directly preceding the current picture. Alternatively, also a picture occurring after the current picture in the sequence may be used as a reference picture. Further, it is possible that the reference picture and/or current picture may not form part of the sequence of pictures. This is the case if, for example, from a series of pictures captured with a video camera supported without motion, a background picture is artificially generated and used as a reference picture.

In the following, it is assumed that the current picture may include motion with respect to the reference picture.

For explaining the notion of motion, it may for example be assumed that visible objects depicted in the current picture may also be identified in the reference picture. Objects may be related to a real-world object or may be formed of a pattern visible in a location of the current picture and/or the reference picture, which pattern may not be related to a real-world object. If one of the objects visible in the current picture, or a part of such an object, may also be identified in the reference picture, but is located differently in the reference picture, then the object will in the following be considered as moving object. If, however, the object and all of its parts is depicted in the reference picture at a corresponding location, the object is considered in the following as a persisting object.

Widening the aspect of motion, it may also be assumed that motion may be caused at a location of the current picture with respect to the reference picture if any property of the location of the current picture is different from the property at a corresponding location of the reference picture.

To identify locations in the current picture or the reference picture, it is for example possible to superpose a coordinate system such as a Cartesian coordinate system on the picture and to identify locations by denoting the corresponding coordinates. For example, in digital imaging, pictures are conventionally described by pixels arranged in a regular two-dimensional grid and represented by dots, squares or the like. In this case, the two-dimensional grid may be used for identifying pixels by grid coordinates, and locations may be described in terms of the pixel coordinates of the pixels belonging to the respective location. A location, in this case, may also correspond to a single pixel. Further, a location may also correspond to a block including a set of pixels, in which the respective pixels associated with the block may be located adjacently, i.e. neighboring, in the two-dimensional grid. As an example, a block may include 10×10 pixels or 100×100 pixels which are located in the picture with a coordinate difference less than 10 or less than 100, respectively, in any of the two-dimensions of the grid.

A location of the reference picture may be regarded as corresponding to a location of the current picture if the location of the reference picture is located essentially in the same place in the reference picture as the location of the current picture in the current picture. This may, for example, be the case if to both pictures, a coordinate system may be superposed, and corresponding locations may be described using corresponding coordinates. In case that both pictures, the current picture and the reference picture, include pixels spatially distributed in a similar manner, locations of the pictures may be regarded as corresponding if including pixels with corresponding grid coordinates.

Each location in the current picture and/or the reference picture may have properties that may be expressed using photometric measures. The properties may be related to aspects of the picture that may be visible for a spectator, such as a luminance or a chrominance, that may be reflected by the photometric measures.

The luminance may reflect the density of luminous intensity. The chrominance may include color information and may be represented, for example, using two color difference components, such as blue-luma and red-luma, or may be represented as a hue value and/or a saturation value of a HSV space or a Cb- or Cr-chrominance value of a YUV-color space or by another value describing the same measurement category.

The property of a location reflected by the photometric measure may, for example, be associated with a location. If the location includes pixels, a corresponding value of the photometric measure may be stored as a value of the pixels.

When comparing the current picture with the reference picture at B100, difference values for locations of the current picture and the reference picture may be determined. The difference values may be based on differences of the photometric measures of corresponding locations. To achieve this, respective differences may be determined for a plurality of locations in the current picture.

These differences may be determined based on a first value and a second value. The first value, related to one of the locations in the current picture, may be descriptive of a photometric measure associated with this location. The second value, on the other hand, may be descriptive of the photometric measure of a corresponding location in the reference picture. Thus, for example, differences of luminance or chrominance values of corresponding locations in the current picture and the reference picture may be determined.

At B102, a histogram is determined based on the difference values calculated at B100. The histogram may reflect the probability of occurrence of all potential difference values. It may, for example, display the observed frequencies in a two-dimensional coordinate system in which the observed frequencies are depicted as ordinate values over intervals of the abscissa. Thus in the histogram, the observed difference values of the current picture and the reference picture may be depicted.

As intervals over the abscissa, any division of the abscissa dividing it into intervals including when joined all potential difference values may be used.

Ordinate values of the histogram may be adapted in accordance with a width of the respective interval. Ordinate values may, for example, be chosen such that an area of the histogram reflects the observed frequency of difference values belonging to the respective interval.

Thus in the histogram, difference values observed with a high frequency are associated with a higher value on the ordinate than difference values occurring rarely. In other words, if for many locations in the current picture, a certain difference value occurs with respect to the corresponding location of the reference picture, the observed frequency of this difference value will be comparably high and will lead to a comparably high ordinate value associated with the difference value as an abscissa value in the histogram.

For example, if a moving object moving over a background is observed in the current picture with respect to a reference picture, this moving object may cause a characteristic difference value depending on properties of the moving object and the background to occur at many locations, and thus will cause the characteristic difference value to have a high frequency observed and depicted in the histogram.

On the other hand, difference values for locations in the picture which remain substantially unchanged, e.g. since belonging to a background or to a persisting object, may have relatively small values near 0. Thus, if only few objects are moving, or if only few locations are related to moving objects, relatively small difference values will be determined for many locations.

As a consequence, a large amount of locations related to persisting objects or the background will lead to small difference values, thus causing a local maximum of histogram values near 0 on the abscissa of the histogram.

Thus, it may be possible to derive from the shape of the histogram, e.g. from the histogram values associated to small values near 0, a threshold that may be used for detecting motion at locations in the current picture with respect to the reference picture.

This is shown at B104, where a threshold is determined based on the histogram, and at B106, where it is shown to detect motion at a respective location in the current picture by comparing the threshold determined at B104 to the difference value of the respective location.

For example, it is possible to determine the threshold such that a comparably large amount of locations has a difference value smaller than the threshold and that only a relatively small amount of locations has a difference value larger than the threshold. In this case, it may be assumed that the threshold is suitable for identifying locations that may belong to moving objects by determining if the respective difference value is larger than the threshold. On the other hand, it may be assumed that locations having a smaller difference value belong to the background or to persisting objects.

Based on the result of motion detection achieved at B106, it may be possible to reduce a temporal noise in the current picture with respect to the reference picture. For reducing temporal noise, conventional methods such as frame piling or replacing pixel values with averaged pixel values may be used.

These conventional techniques may be applied to locations in which motion was not detected. For locations that have been identified to be likely to contain motion, i.e. to be related to a moving object, no temporal noise reduction may be applied. This allows suppressing motion artifacts that may result from applying conventional temporal noise reduction techniques to locations containing motion.

Thus, by applying the method illustrated in FIG. 1, it is possible to differentiate between a desired image content and a noise disturbance. Since the method is independent of noise characteristics, no determination of the noise characteristics is needed and the method may be applied independently of the noise characteristics and the image content. When used as a method for deciding whether temporal noise reduction should be applied in a location or not, the method allows suppressing motion artifacts.

As already mentioned above, the method illustrated in FIG. 1 may be applied to a current picture and a reference picture which include pixels corresponding to locations of the pictures and storing the related photometric measures. In this case, the difference values may be determined based on the photometric measures of corresponding pixels of the current picture and the reference picture. The histogram is then determined in view of the difference values that have been determined by a pixel-wise calculation.

Alternatively or in addition, pixels disposed spatially in adjacent positions in the current picture or the reference picture may be assigned to blocks, as already described. In the method illustrated in FIG. 1, the locations may in this case include blocks, and the difference values for the blocks may be determined based on differences between pixel values of a respective block of the current picture and pixel values of a corresponding block of the reference picture.

If corresponding blocks include corresponding pixels, the difference values may for example be determined by summing absolute differences between pixel values of pixels of the current picture comprised within the block and pixel values of corresponding pixels of the reference picture. Thus, a block-wise difference value may be determined, reflecting differences of pixel values included in respective blocks.

A block-wise determination of the difference values allows, for example, to easily determine the histogram with comparably little computational effort and without substantially changing a distribution of the difference values and the shape of the histogram, compared to a pixel-wise determination of the difference values. Thus, motion detection may be performed with less computational effort.

Figure 2:
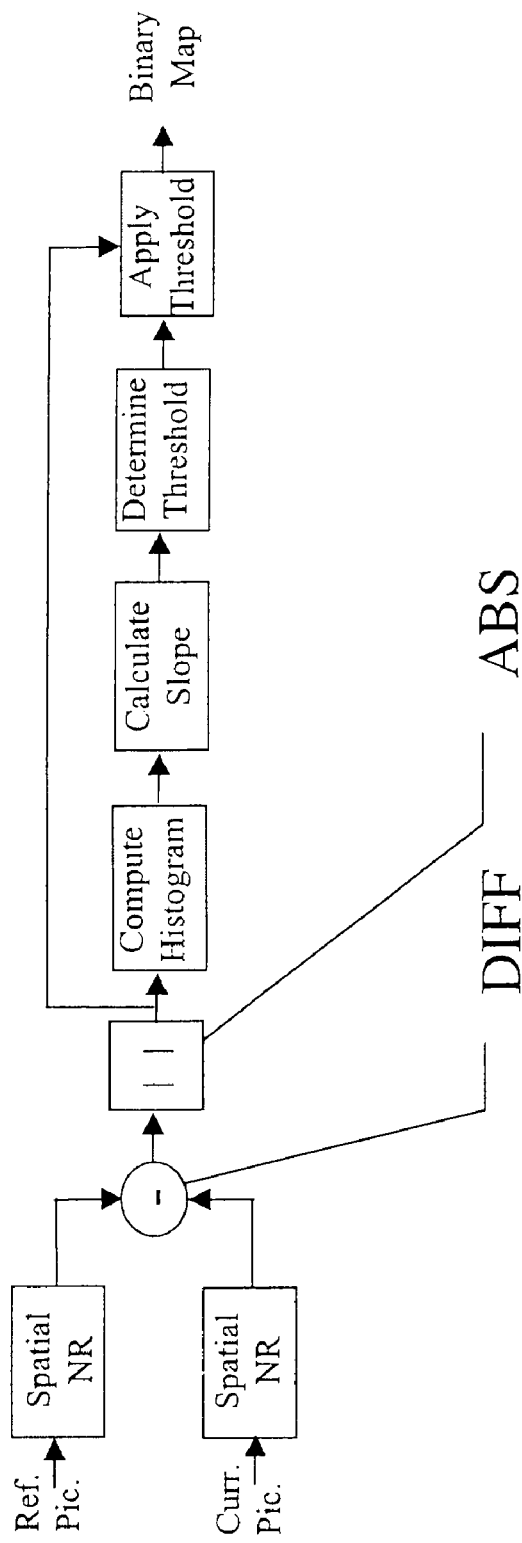
FIG. 2 is a block diagram of an embodiment of the invention.

FIG. 2 is a block diagram illustrating a further embodiment of the invention. In the embodiment, spatial noise reduction is applied separately to the current picture and the reference picture. Spatial pre-filtering by applying spatial noise reduction may be applied, e.g. for very noisy pictures, to reduce the noise level.

Difference values for locations of the current picture and the reference picture are then calculated at DIFF as described at B100 in FIG. 1. Additionally, absolute values of the differences of the photometric measures of the current picture and the reference picture may be used instead of the signed differences in the embodiment, as illustrated at ABS. The absolute values of the differences may be considered as difference values and used as a basis for determining the histogram.

For evaluating the shape of the histogram, a slope of the histogram may be calculated. For this purpose, the histogram may be smoothed, e.g. by applying a smoothing filter, to achieve differentiable function. Alternatively, the slope may be determined by dividing a difference of ordinate values attributed to two neighboring abscissa values in the histogram by the difference of the abscissa values, thus calculating the steepness of a straight line connecting the ordinate or histogram values.

The slope may be used for analyzing a distribution of the observed frequencies in the histogram and/or the shape of the histogram. For example, the slope may be used to locate local maxima in the histogram corresponding to locations which are likely to belong to the background or to persisting objects or to include motion. Consequently, the threshold may be determined based on the slope.

By analyzing the slope, the shape of the histogram near the abscissa value 0 may be explored. For this, it is possible to determine a first abscissa value in the histogram for which a local minimum of the slope is attained and a second abscissa value for which a subsequent local maximum of the slope is attained, and to determine the threshold based on the first abscissa value and the second abscissa value. For example, the threshold may be selected from an interval extending between the first abscissa value and the second abscissa value.

Thus, in the embodiment shown in FIG. 2, the threshold may be determined based on the slope of the histogram.

The threshold may be applied to detect motion by comparing the threshold to the difference value of a respective location. In the embodiment in FIG. 2, a location may be identified as being likely to contain motion if the threshold is smaller than the absolute difference calculated for the respective location. Further, a location may be identified as being likely not to contain motion if the threshold is larger than the absolute difference calculated for the respective location.

In the embodiment, a binary map is determined in which locations likely to contain motion may be identified.

Figure 3:
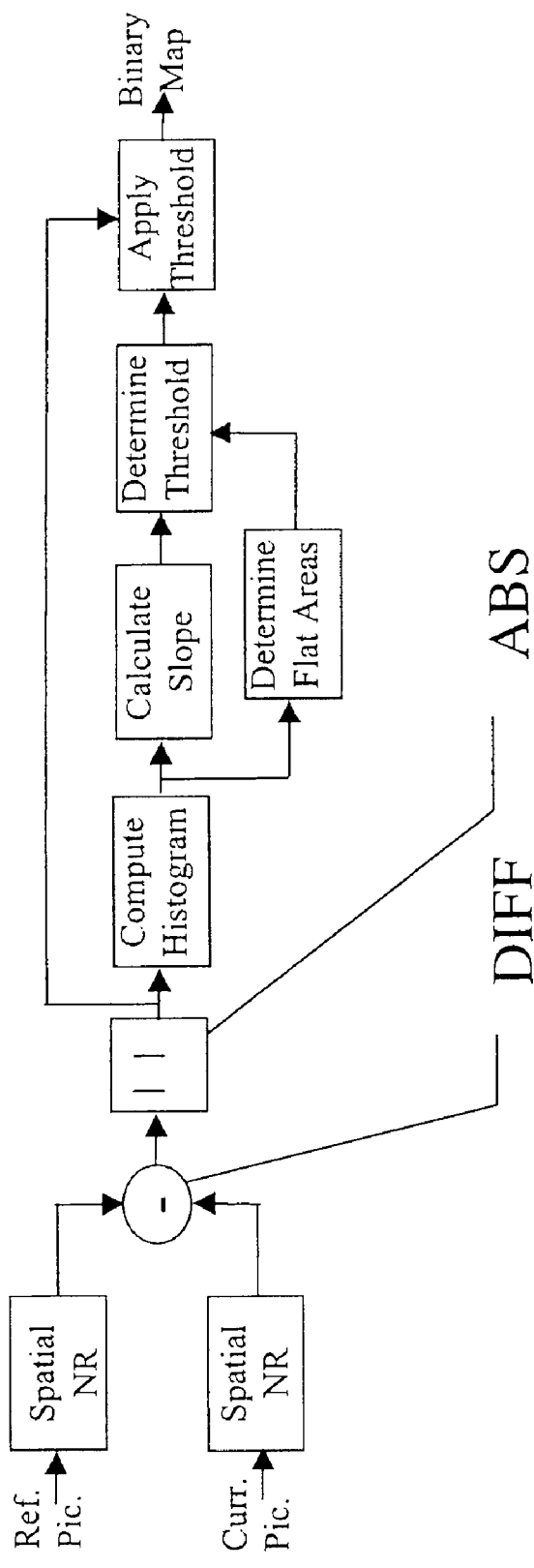
FIG. 3 is a block diagram of a further embodiment of the invention.

In FIG. 3, a further embodiment of the invention is illustrated by a block diagram. Blocks corresponding to those depicted in FIG. 2 may be assumed to have similar functionality.

In addition to the embodiment illustrated in FIG. 2, in the embodiment of FIG. 3, flat areas may be determined. The determination of the threshold may then be performed based on the result of determining flat areas. Consequently, different thresholds may be determined and applied to respective locations depending on whether the respective location belongs to a flat area or not. For flat areas, larger thresholds may be selected than for non-flat areas, which allows effective recognition of temporal noise.

For determining flat areas, the current picture and the reference picture may be divided into blocks, e.g. by sliding or static block building. For each block, a homogeneity of the block may be determined. Based on the homogeneity of the block, the threshold may be determined. For blocks with a comparably high homogeneity, it may be assumed that the block belongs to a flat area. For less homogenous blocks, however, the block is may be assumed as not belonging to a flat area.

For determining the homogeneity of the block, an intra-block histogram may be determined based on pixel difference values. For determining the intra-block histogram, respective pixel difference values may be determined for a plurality of pixels comprised within the block. The pixel difference values may be determined based on a pixel difference between a first pixel value and a second pixel value. The first pixel value may be descriptive of the photometric measure of one of the pixels belonging to the block of the current picture, and the second pixel value may be descriptive of the photometric measure of a corresponding pixel in the reference picture. In the intra-block histogram, observed frequencies of pixel difference values are depicted. The homogeneity of the block may be determined based on a width of the intra-block histogram. The width may, for example, be determined by analyzing mathematical properties of the intra-block histogram. It is further possible to apply a smoothing filter before analyzing the intra-block histogram.

Figure 4:
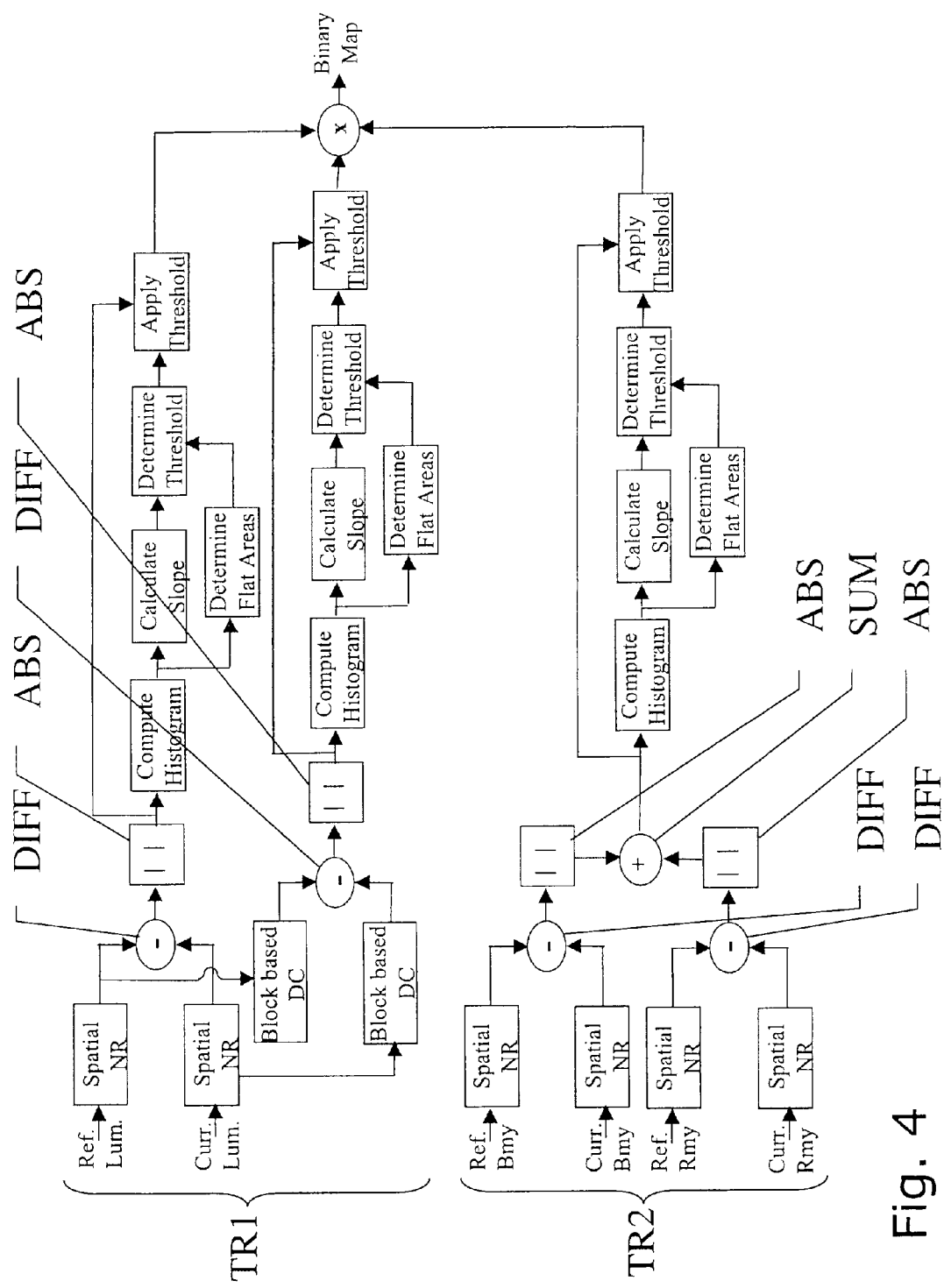
FIG. 4 is a block diagram of still a further embodiment of the invention.

In FIG. 4, a block diagram illustrating a further embodiment of the invention is depicted. The embodiment combines various approaches of detecting motion in accordance with the embodiments described in the above.

In the embodiment, entities of the current picture and the reference picture may be generated, each entity reducing information comprised within the current picture and the reference picture to information related to at least one of a plurality of photometric measures.

For example, the current picture and the reference picture may be reduced to their luminance component, as depicted in an upper thread TR1 of FIG. 4. To the resulting entities, spatial noise reduction is applied. Subsequently, the entities are processed in accordance with the embodiment depicted in FIG. 3. The processing is performed on the one hand based on the pixel values, as depicted in the upper half of thread TR1. On the other hand, the processing is performed based on a block based difference calculation, as described in the above and as depicted in the lower half of thread TR1. In both approaches, a threshold is determined and applied to the absolute difference picture.

Additionally, as illustrated in a lower thread TR2 of FIG. 3, entities of the current picture and the reference picture may be generated by reducing the information to chrominance information such as a Cb—Cr-chrominance value of a Yuv-color space. To the entities, spatial noise reduction may be applied. Difference values may then be calculated by subtracting pixel values of corresponding pixels of an entity of the current picture and of an entity of the reference picture. For this, differences may be calculated based on entities reduced to the same kind of information, i.e. those reduced to the Cb-chrominance value or the Cr-chrominance value. This is illustrated at DIFF. Absolute values of these differences may then be taken and added, as illustrated at ABS. For example, the absolute values may be added if belonging to the same pixel in the current picture, as illustrated at SUM. Based on this accumulated absolute values, a further histogram may be determined and evaluated so as to determine a further threshold. The further threshold may be applied to the current picture as described in the above, e.g. for the embodiment depicted in FIG. 3.

Based on the three different thresholds determined as illustrated in FIG. 4, motion detection may be performed. For example, a location may be determined as being likely to contain motion by comparing each of the thresholds to the respective difference value. If at least one of the difference values is larger than the respective threshold, the respective location may be identified as being likely to contain motion. Alternatively, a respective location may only be determined as being likely to contain motion if all of the difference values calculated in FIG. 4 are larger than the respective threshold. It should be noted that combining the results of motion detection based on different photometric measures may be combined in any way, e.g. by an arbitrary voting algorithm.

Performing motion detection with respect to various photometric measures may be used in order to increase robustness of the result even under varying luminance or chrominance conditions in the current and/or the reference picture.

Figure 5B:
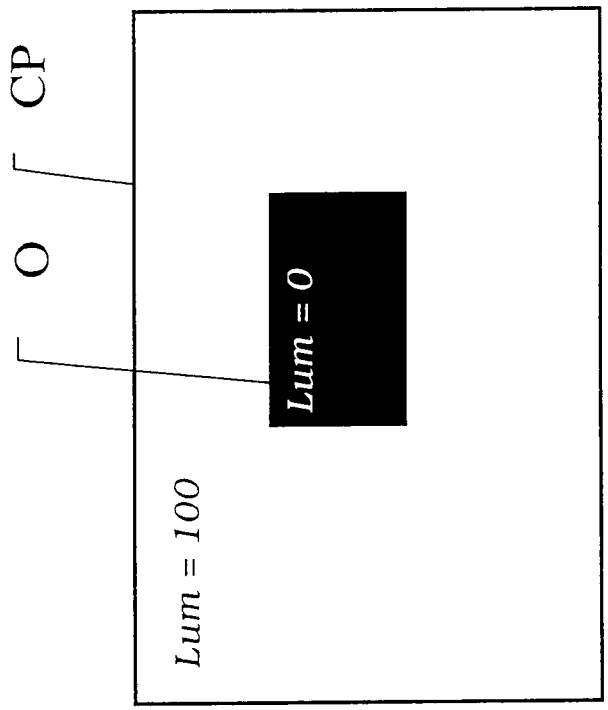
FIGS. 5A and 5B illustrate a current picture and a reference picture to be analyzed by an embodiment of the invention.
Figure 5A:
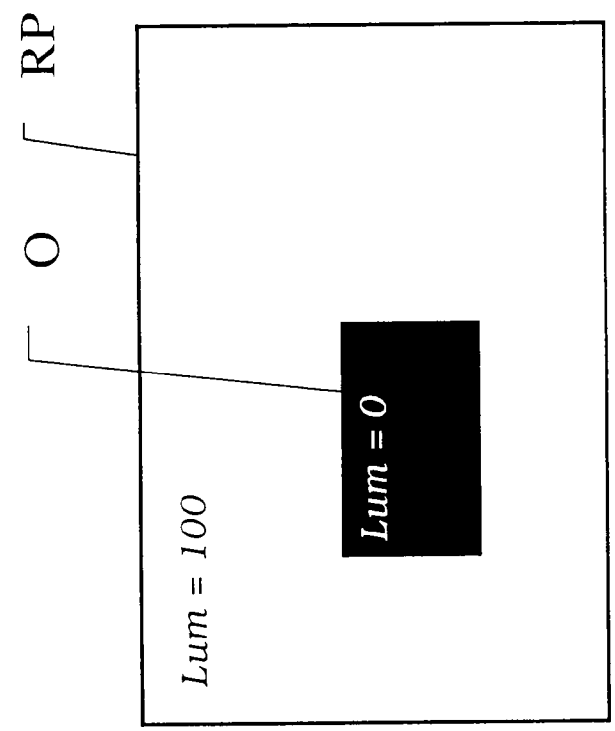

In FIG. 5A, the luminance of a reference picture RP showing an object O is illustrated. In the background, the luminance is set to a value of 100, whereas for the object O, the luminance is set to 0.

FIG. 5B illustrates a current picture CP with respect to reference picture RP. In current picture CP, the object O has moved toward the upper right corner. As in FIG. 5A, the luminance is set in accordance with the position of object O.

Figure 6:
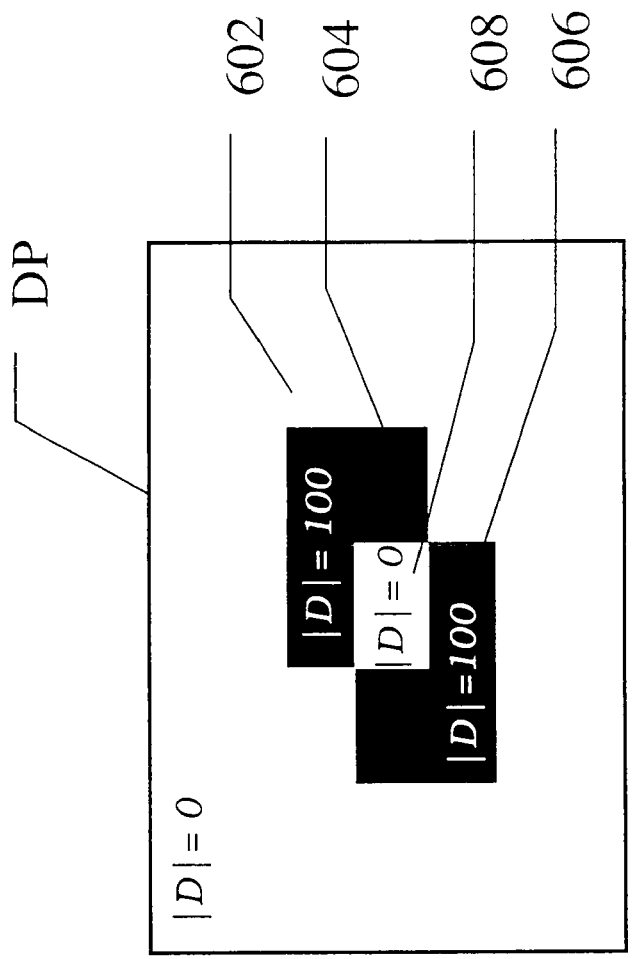
FIG. 6 illustrates a difference picture with respect to the current picture and the reference picture illustrated in FIGS. 5A and 5B.

FIG. 6 shows a difference picture DP of current picture CP with respect to reference picture RP. In an area 602, an absolute difference |D| is 0 due to the luminance conditions in corresponding locations of RP and CP. In an area 604, the absolute difference |D| is equal to 100 as well as in an area 606, due to the motion caused by object O in CP with respect to RP. In an area 608, however, the absolute difference absolute |D| is 0 since luminance conditions are both 0 in current picture CP and reference picture RP in the area.

Figure 7:
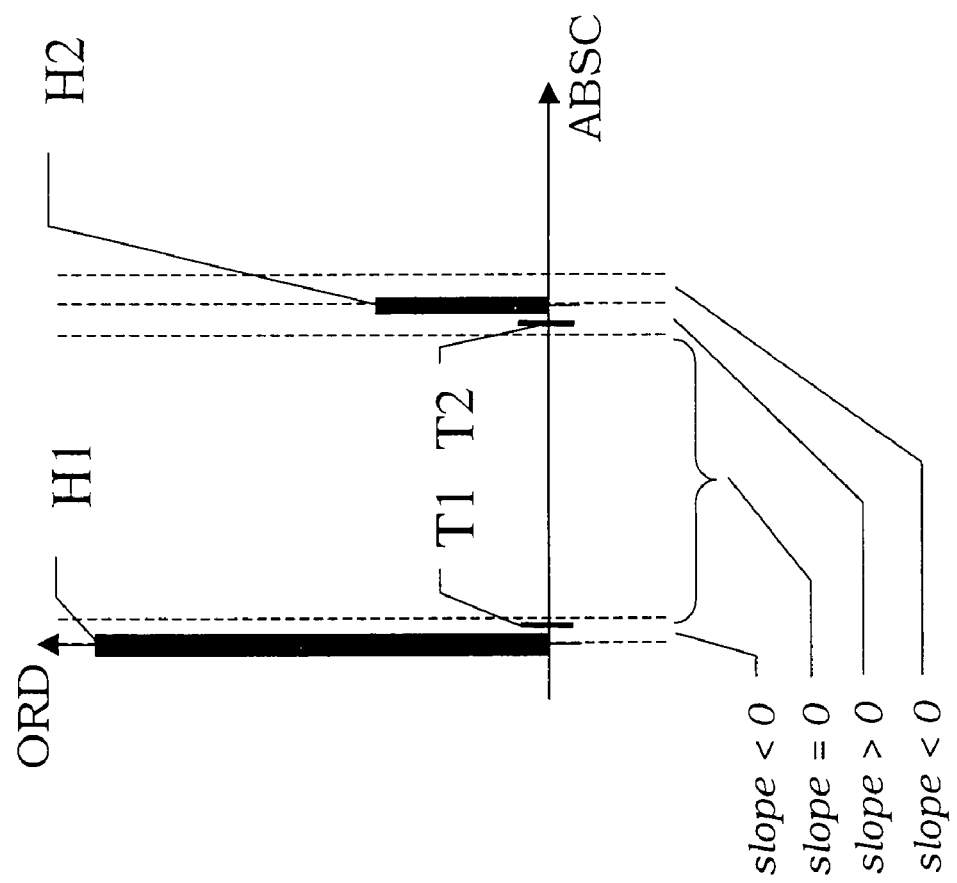
FIG. 7 illustrates an analysis of a histogram based on the difference picture.

In FIG. 7, a histogram based on absolute differences |D| in difference picture DP of FIG. 6 is depicted. The histogram is shown in a coordinate system spanned by an abscissa ABSC and an ordinate ORD.

A first histogram value H1 located at 0 on the abscissa ABSC indicates the large number of pixels with absolute difference |D|=0 in difference picture DP. The smaller histogram value H2 indicates the smaller number of pixels with absolute difference |D|=100 in difference picture DP of FIG. 6.

When determining the slope, as described in the above, based on straight lines connecting ordinate values belonging to neighboring abscissa values such as natural numbers in the histogram, the slope may be determined to be negative between 0 and 1, to be 0 between 1 and 99, to be positive in an interval between 99 and 100 and to be negative in an interval between 100 and 101.

As described in the above, a first threshold T1 may be set arbitrarily in the interval extending from 0 in which the slope is negative. Additionally or alternatively, a further threshold T2 may be set in the interval in which the slope is positive.

Both thresholds T1 and T2 may then be used for identifying locations which are likely to belong to a moving object or which are likely to belong to the background or to a persisting object. In particular, first threshold T1 may be suitable for identifying background locations and persisting objects by identifying locations for which the absolute difference |D| is smaller than T1. On the other hand, threshold T2 may be suitable for identifying locations belonging to moving objects.

Figure 8:
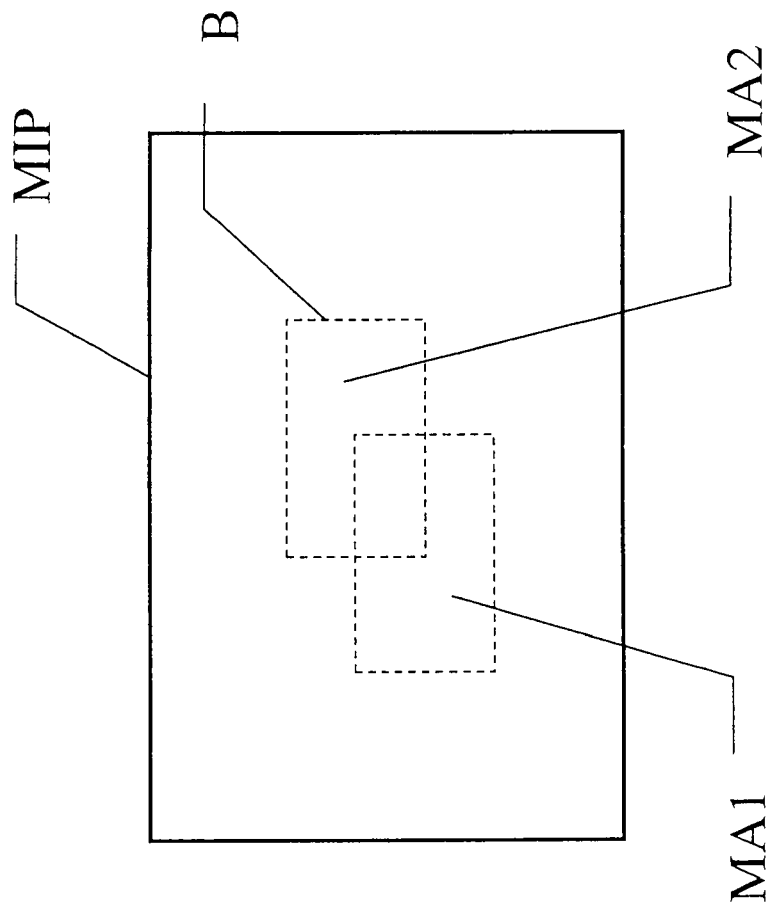
FIG. 8 illustrates the analysis result wherein locations including motion are marked.

The result of motion detection based on the histogram illustrated in FIG. 7 is shown in FIG. 8, illustrating a motion identifying picture MIP in which areas MA1 and MA2, which are likely to belong to a moving object, are identified by boundary B. Boundary B may result from comparing absolute difference |D| from difference picture DP as depicted in FIG. 6 to one of thresholds T1, T2. In the example, both thresholds lead to the same result of motion detection visualized by boundary B. For more complicated pictures comprising various pixel values, threshold T1 may be suitable for identifying locations belonging to a background and threshold T2 may be suitable for discriminating moving objects.

The larger threshold T1 is set, the more locations are identified as belonging to the background, and the more pixels may be e.g. subjected to temporal noise reduction. On the other hand, the larger threshold T2 is set, the less locations are identified as belonging to a moving object. Thus, the selection of threshold T2 may result in a more or less precise identification of moving objects.

Figure 9:
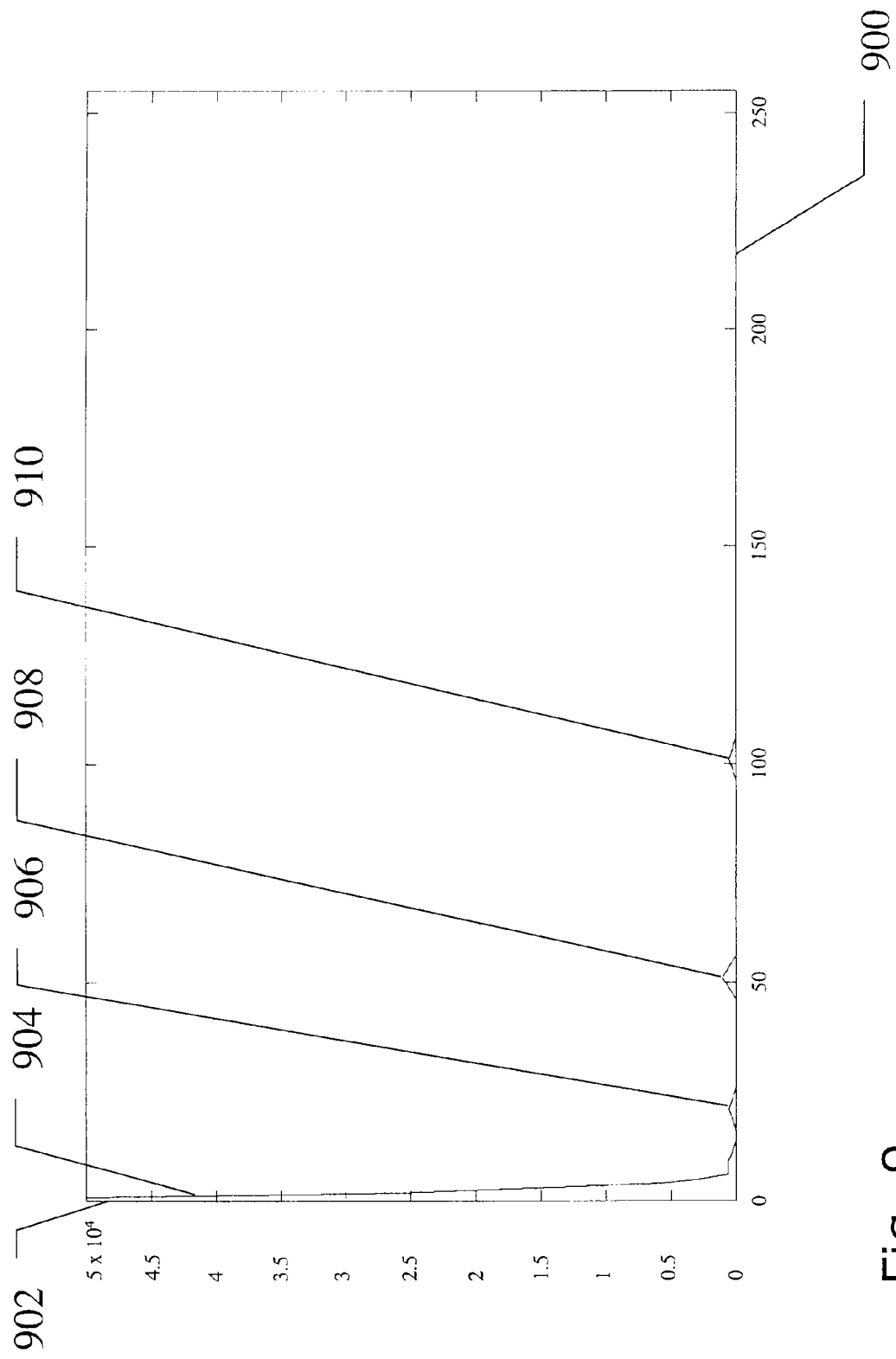
FIG. 9 illustrates a further histogram generated by an embodiment of the invention.

FIG. 9 illustrates a further histogram determined in an embodiment of the invention. On an abscissa 900, absolute values of the difference values are depicted. On an ordinate 902, frequencies of the absolute values of the difference values are depicted. For allowing an easy analysis of properties of the histogram, the histogram has been subjected to a smoothing filter, resulting in a continuous histogram function. The histogram function includes several local maxima near the abscissa values corresponding to 904, 906, 908, and 910. A global maximum is reached near 904.

Figure 10:
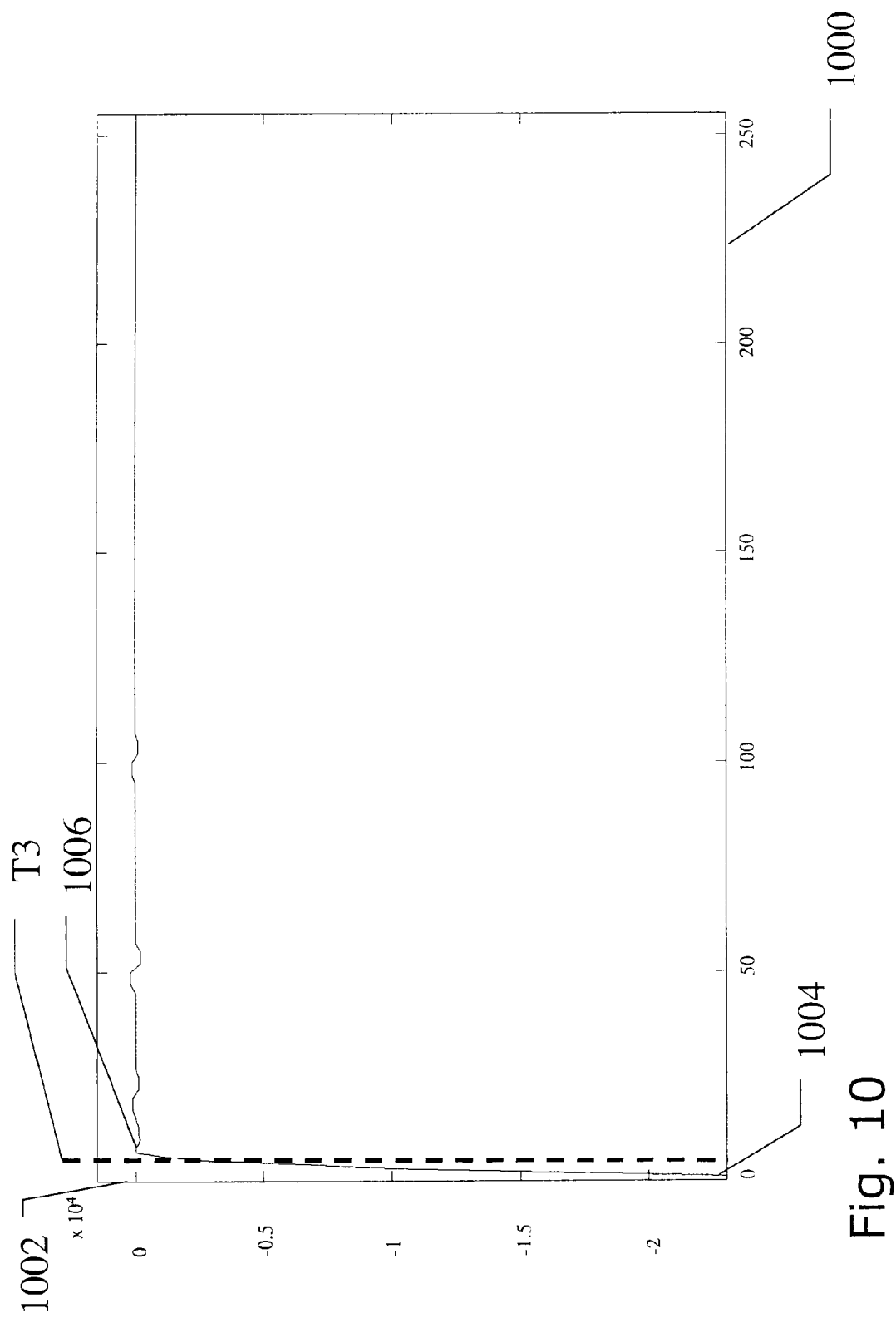
FIG. 10 illustrates analyzing a slope of the histogram illustrated in FIG. 9.

In FIG. 10, the slope of the histogram function depicted in FIG. 9 is illustrated in a coordinate system spanned by an abscissa 1000 and an ordinate 1002. Near 1004, a global minimum of the slope is approximately attained. A corresponding abscissa value near 0 may thus be selected as a first abscissa value.

At 1006, a subsequent local maximum of the slope is attained. A corresponding abscissa value may thus be selected as second abscissa value. In this embodiment of the invention, threshold T3 may then be selected based on the first abscissa value and the second abscissa value, e.g. from an interval having the first abscissa value and the second abscissa value as boundaries.

If threshold T3 is selected in accordance with the embodiment illustrated in FIG. 10 and set to a value near a global minimum of the slope for small abscissa values, threshold T3 may be applicable for identifying locations which are likely to belong to the background or persisting objects.

Figure 11:
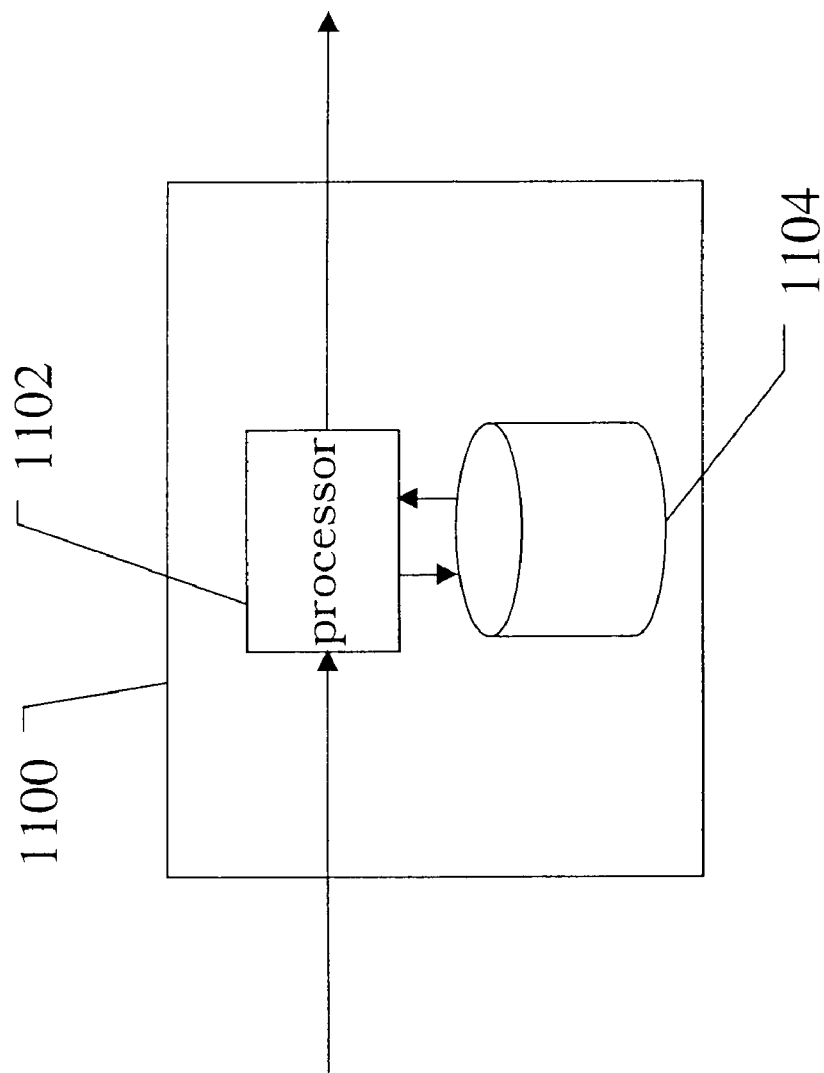
FIG. 11 illustrates an embodiment of a motion detection unit.

FIG. 11 illustrates a motion detection unit 1100 for detecting motion in the current picture with respect to the reference picture. The current picture and the reference picture may be received by a processor 1102 and stored in a storage 1104. Processor 1102 may perform motion detection when receiving the current picture and the reference picture. Alternatively, the current picture and the reference picture may be retrieved from storage 1104.

Processor 1102 may be configured to determine the histogram of the difference values related to the locations in the current picture and the reference picture. Motion may be detected at a respective location in the current picture based on the difference value related to the respective location and on the histogram of the difference values.

Further, a computer program product comprising program code may be stored in storage 1104. The program code may be configured to perform, when loaded into processor 1102, a method for motion detection in accordance with one of the above-described embodiments.

Figure 12:
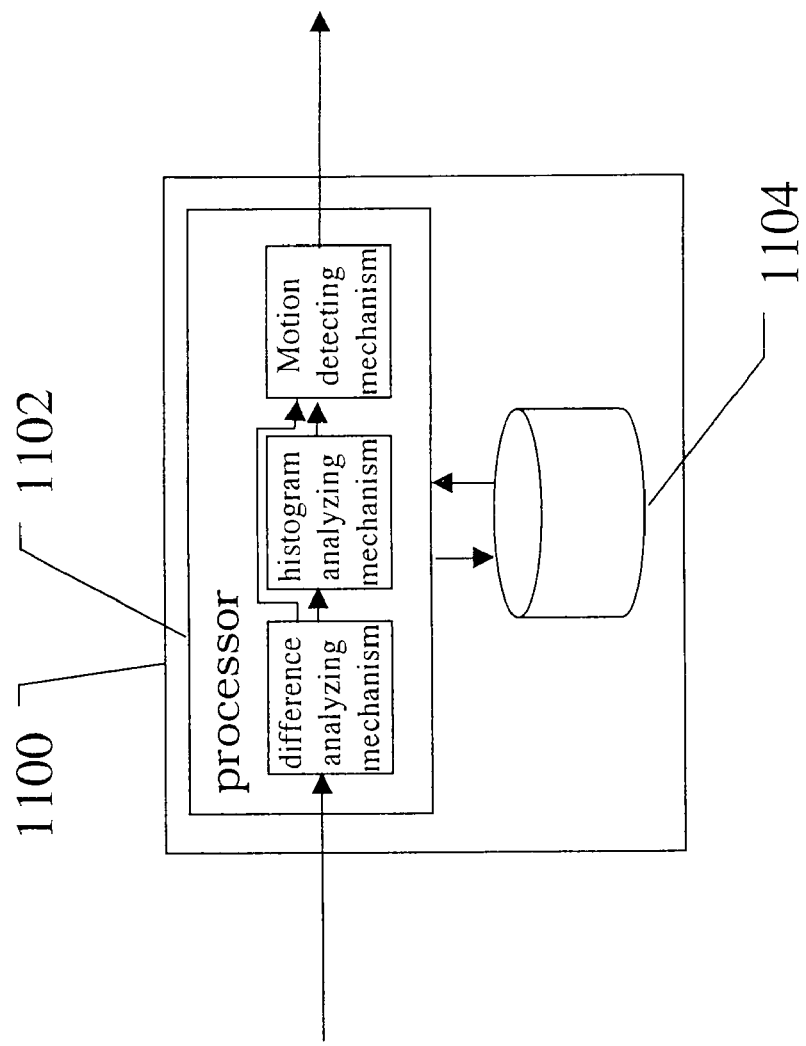
FIG. 12 illustrates another embodiment of a motion detection unit.

FIG. 12 illustrates a further embodiment of motion detection unit 1100 including processor 1102 and storage 1104. In the embodiment, processor 1102 further includes a difference analyzing mechanism which is configured to analyze the difference values related to the locations in the current picture by determining the difference between the first value and the second value descriptive of the photometric measure related to the respective location.

Further, processor 1102 includes a histogram analyzing mechanism which is configured to generate and to analyze the histogram of the difference values, e.g. in accordance with one of the embodiments illustrated in FIGS. 7 and 9.

Still further, processor 1102 includes a motion detecting mechanism which is configured to detect motion at a respective location in the current picture based on the outcome of the histogram analyzing mechanism and of the difference analyzing mechanism.

The histogram analyzing mechanism may further be configured to determine a threshold based on the histogram. In this case, the motion detecting mechanism may be configured to detect motion based on the threshold determined by the histogram analyzing mechanism and on the difference values as determined by the difference analyzing mechanism.

Figure 13:
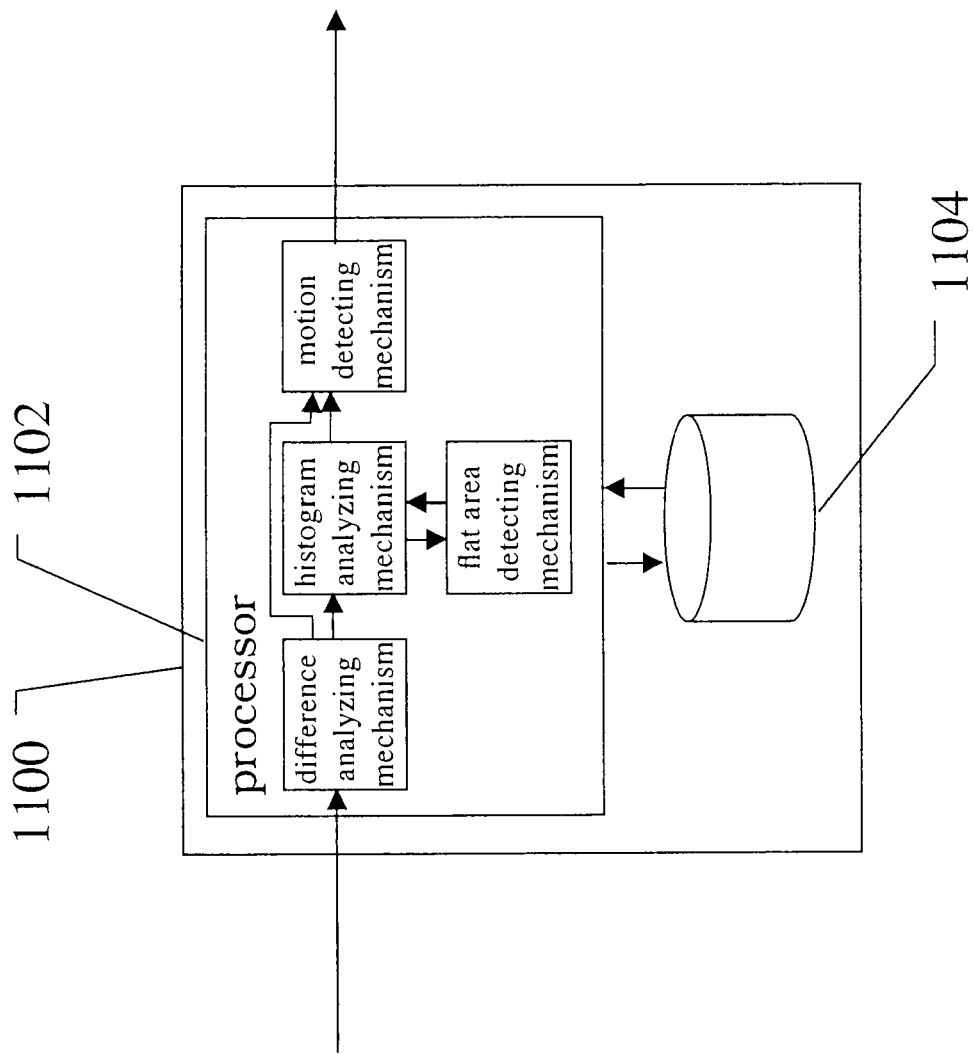
FIG. 13 illustrates yet another embodiment of a motion detection unit.

In FIG. 13, it is illustrated that processor 1102 may further include a flat area detecting mechanism configured to detect the flat areas in the current picture and/or the reference picture based on the intra-block histogram of the intra-block difference values determined by the histogram analyzing mechanism. The intra-block histogram may be determined in accordance with the embodiment illustrated in FIG. 3. In this embodiment, motion may be detected based on the outcome of the flat area detecting mechanism.

Figure 14:
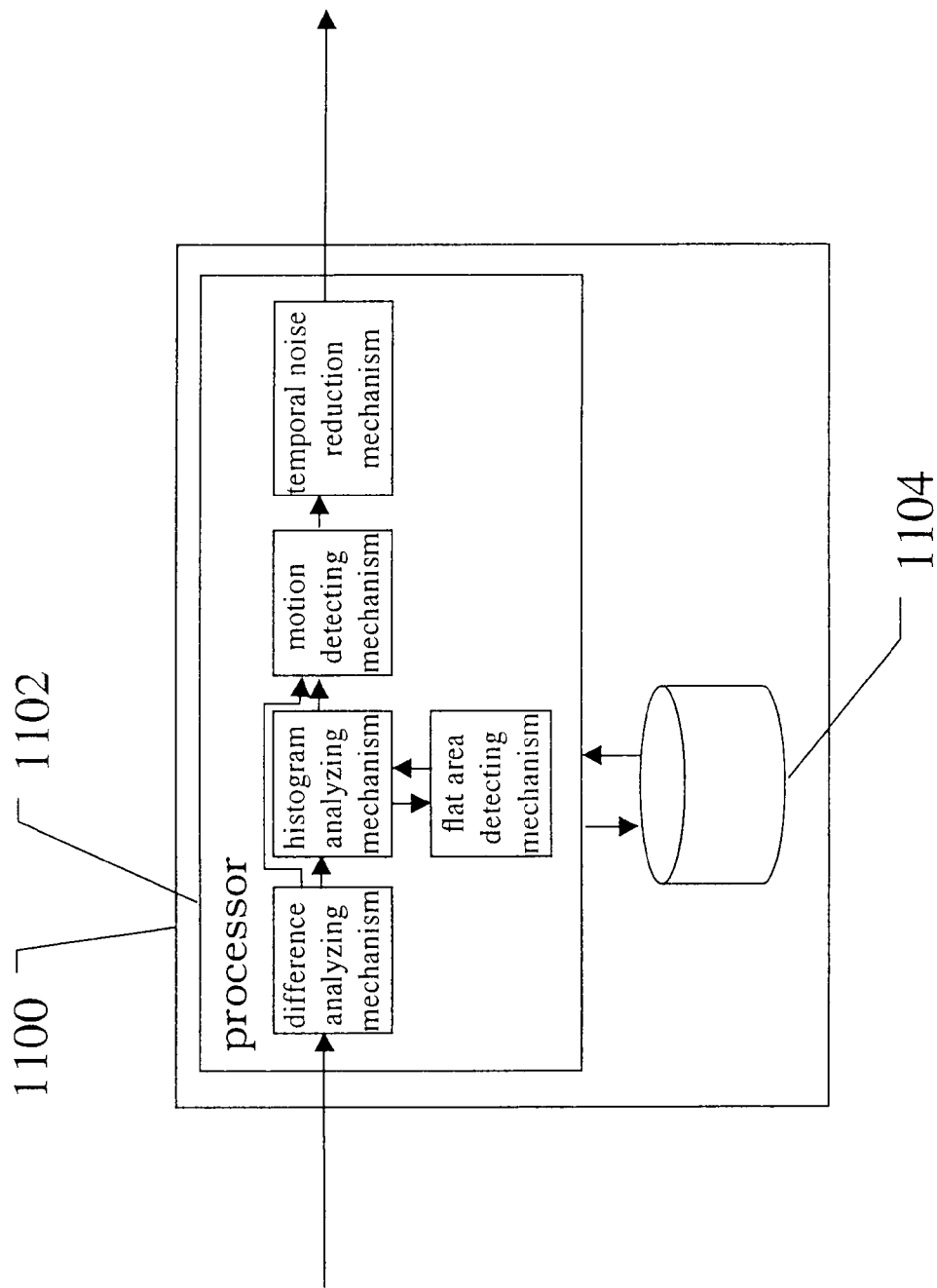
FIG. 14 illustrates a further embodiment of a motion detection unit.

In FIG. 14, a further embodiment of motion detection unit 1100 is illustrated, in which processor 1102 further includes a temporal noise reduction mechanism. The temporal noise reduction mechanism may be configured to reduce temporal noise in the current picture with respect to the reference picture based on an outcome of the motion detecting mechanism. For this purpose, temporal noise reduction methods may be applied to locations at which no motion has been detected. This allows avoiding motion artifacts that otherwise could result from temporal noise reduction applied to locations containing motion.

Figure 15:
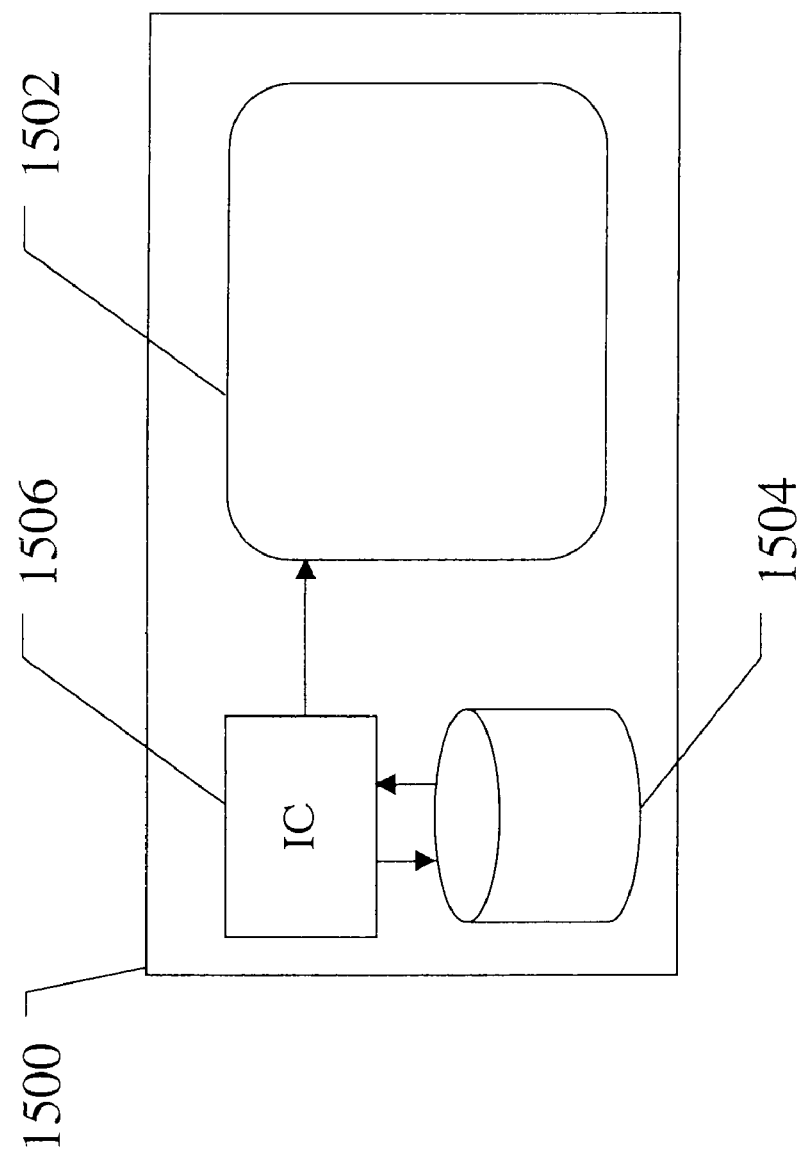
FIG. 15 illustrates a display device according to an embodiment of the invention.

In FIG. 15, an image displaying device 1500 according to an embodiment of the invention is illustrated. Image displaying device 1500 includes a display 1502 for displaying pictures such as the current picture or the reference picture and/or for displaying sequences of pictures such as video streams or the like. The pictures to be displayed may be stored in a storage 1504. An integrated circuit 1506 may further be included. Integrated circuit 1506 may be configured to perform a method for motion detection for a current picture with respect to a reference picture stored in storage 1504 in accordance with any of the above-described methods. Further, integrated circuit 1506 may include a temporal noise reduction mechanism, e.g. similar to the one illustrated in FIG. 14. Thus, with integrated circuit 1506, a sequence of pictures, such as a video stream, may be displayed on display 1502 with reduced temporal noise, while motion artifacts may be avoided. Integrated circuit 1506 may thus be considered as a motion detection unit.

Figure 16:
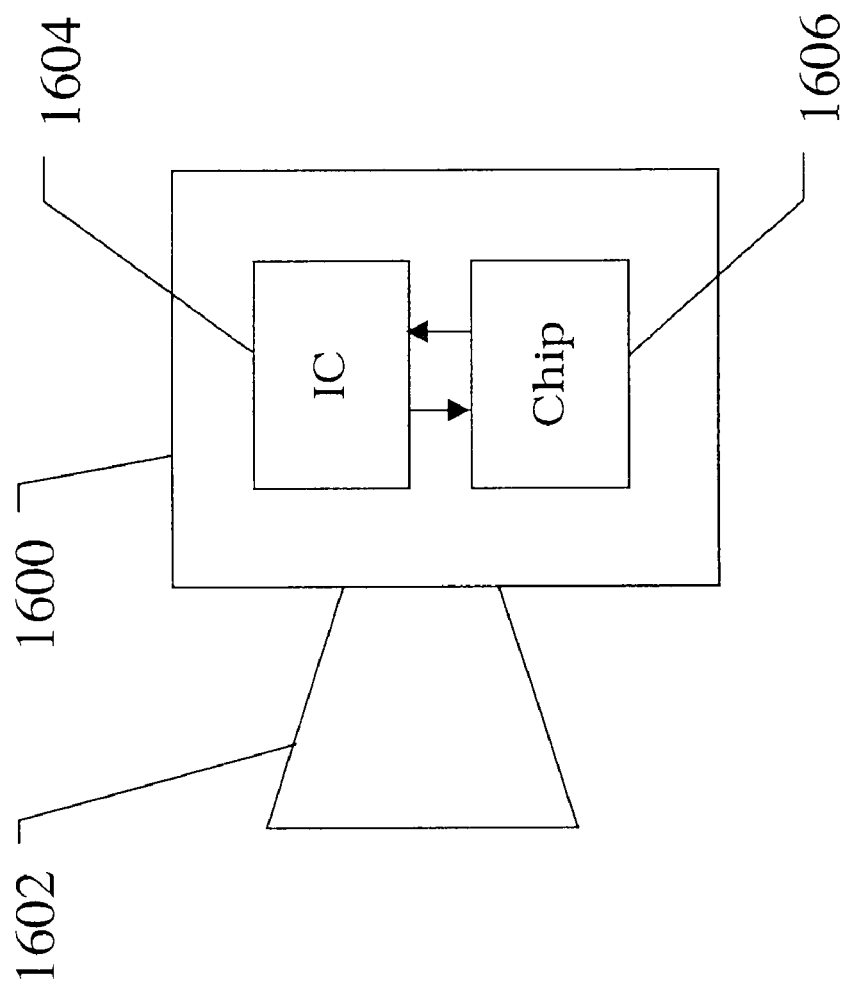
FIG. 16 illustrates an image capturing device in accordance with an embodiment of the invention.

In FIG. 16, an image capturing device 1600 is illustrated. Image capturing device 1600 includes an optical setup 1602 configured to capture the current picture and the reference picture e.g. as part of a video stream. Further, image capturing device 1600 may include a motion detection unit, e.g. implemented on an integrated circuit 1604 which is configured to perform a method for motion detection in accordance with any of the above-described embodiments. Further, a chip 1606 for storing the current picture and the reference picture, e.g. as part of a video sequence, may be included. Chip 1606 may thus be considered as a storage for storing video streams.

Although specific embodiments have been illustrated and described in the above, it will be appreciated by those of ordinary skill in the art that a variety of alternate and/or equivalent implementations may be substituted for the specific embodiments shown and described without departing from the scope of the present invention. The application is intended to cover any adaptions or variations of the specific embodiments discussed herein. Therefore, it is intended that the invention be limited only by the claims and the equivalents thereof.

The invention claimed is:

1. A method for motion detection in a current picture with respect to a reference picture, comprising:
   determining, at a processor, a plurality of locations in the current picture respective difference values based on a difference between a first value and a second value, wherein the first value is descriptive of a photometric measure of one of the locations in the current picture and the second value is descriptive of the photometric measure of a corresponding location in the reference picture;

determining a histogram based on the difference values;

determining a threshold based on the histogram;

detecting motion at a respective location in the current picture by comparing the threshold to the difference value of the respective location;

determining a slope of the histogram;

determining a first abscissa value for which a local minimum of the slope is attained and a second abscissa value for which a subsequent local maximum of the slope is attained; and selecting the threshold from an interval extending between the first abscissa value and the second abscissa value.

2. The method according to claim 1, wherein at least one of the locations of the current picture and the reference picture corresponds to a pixel.

3. The method according to claim 1, wherein at least one of the locations of the current picture and the reference picture corresponds to a block comprising a plurality of pixels disposed spatially in adjacent positions.

4. The method according to claim 3, wherein the respective difference value for the block is determined by summing absolute differences between pixel values of pixels of the current picture comprised within the block and pixel values of corresponding pixels of the reference picture, the pixel values being descriptive of the photometric measures of the respective pixels.

5. The method according to claim 3 or 4, further comprising:

determining a homogeneity of the block; and determining the threshold based on the homogeneity of the block.

6. The method according to claim 5, wherein the homogeneity of the block is determined comprising:

determining for a plurality of pixels comprised within the block respective pixel difference values based on a pixel difference between a first pixel value and a second pixel value, wherein the first pixel value is descriptive of the photometric measure of one of the pixels in the current picture and the second pixel value is descriptive of the photometric measure of a corresponding pixel in the reference picture;

determining an intra block histogram based on the pixel difference values; and determining a width of the intra block histogram.

7. The method according to claim 1, wherein for at least two photometric measures, a respective threshold is determined, and wherein detecting motion at a respective location in the current picture is performed based on the respective thresholds.

8. The method according to claim 1, wherein the photometric measure is a luminance and/or a chrominance.

9. The method according to claim 1, wherein determining the difference value comprises calculating an absolute value of the difference between the first value and the second value.

10. The method according to claim 1, further comprising: reducing a spatial noise in the current picture and/or the reference picture.

11. The method according to claim 1, further comprising: reducing a temporal noise in a respective location of the current picture based on the result of detecting motion in the respective location.

12. A motion detection unit for detecting motion in a current picture with respect to a reference picture, comprising:

a storage unit configured to store the current picture and the reference picture; and a processor configured to determine a histogram of difference values related to locations in the current picture and the reference picture, to detect motion at a respective location in the current picture based on the related difference value and on the histogram of difference values, to determine a threshold based on the histogram, to detect the motion at the respective location in the current picture based on a comparison of the threshold with the difference value at the respective location, and to determine a slope of the histogram, a first abscissa value for which a local minimum of the slope is attained and a second abscissa value for which a subsequent local maximum of the slope is attained, and further to select the threshold from an interval extending between the first abscissa value and the second abscissa value.

13. The motion detection unit according to claim 12, wherein the processor comprises:

a difference analyzing mechanism configured to analyze the difference values related to locations in the current picture by determining a difference between a first value and a second value, the first value being descriptive of a photometric measure related to the respective location in the current picture and the second value being descriptive of the photometric measure of a corresponding location in the reference picture;

a histogram analyzing mechanism configured to generate and analyze a histogram of the difference values;

a motion detecting mechanism configured to detect motion at a respective location in the current picture based on the outcome of the histogram analyzing means related to the location and on the outcome of the histogram analyzing mechanism.

14. The motion detection unit according to claim 13, wherein the histogram analyzing mechanism is further configured to determine a threshold, and wherein the motion detecting mechanism is configured to detect motion based on the threshold.

15. The motion detection unit according to claim 14, further comprising:

a flat area detecting mechanism configured to detect flat areas in the current picture and/or the reference picture based on an intra block histogram of intra block difference values determined by the histogram analyzing mechanism, and wherein the threshold is determined based on an outcome of the flat area detecting mechanism.

16. The motion detection unit according to claim 13 or 14, wherein the processor further comprises a temporal noise reduction mechanism configured to reduce temporal noise in the current picture with respect to the reference picture based on an outcome of the motion detecting mechanism.

17. Image capturing device, comprising:

an optical set-up configured to capture a current image and a reference image; and the motion detection unit according to claim 12.

18. Image displaying device, comprising:

a display; and the motion detection unit according to claim 12.

19. A non-transitory computer readable storage medium having stored thereon a computer program, which when executed by a processor causes the processor to perform a method comprising:

determining a plurality of locations in the current picture respective difference values based on a difference between a first value and a second value, wherein the first value is descriptive of a photometric measure of one of the locations in the current picture and the second value is descriptive of the photometric measure of a corresponding location in the reference picture;

determining a histogram based on the difference values;

determining a threshold based on the histogram;

detecting motion at a respective location in the current picture by comparing the threshold to the difference value of the respective location;

determining a slope of the histogram;

determining a first abscissa value for which a local minimum of the slope is attained and a second abscissa value for which a subsequent local maximum of the slope is attained; and selecting the threshold from an interval extending between the first abscissa value and the second abscissa value.

* * * * *